July 7, 1970     D. HUMPHRISS ET AL     3,518,987
EYE EXERCISING DEVICES
Filed April 26, 1967
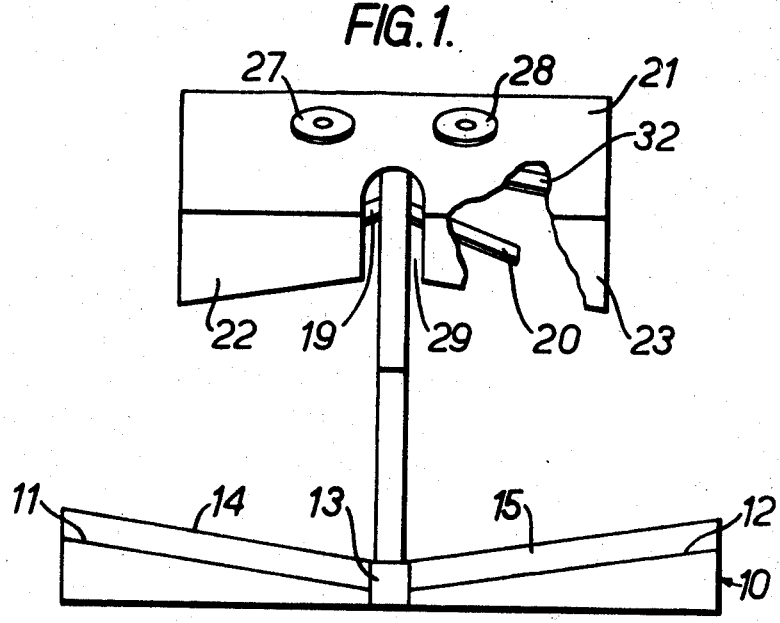
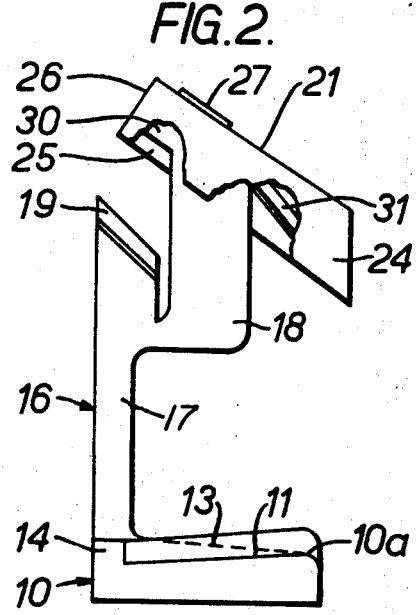
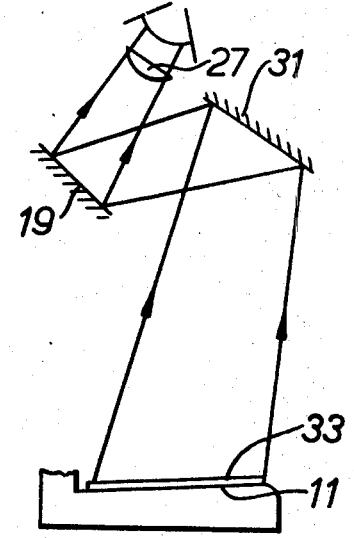
INVENTOR
DERYCK HUMPHRISS
By Young & Thompson
ATTYS.

United States Patent Office 3,518,987
Patented July 7, 1970

3,518,987
EYE EXERCISING DEVICES
Deryck Humphriss, P.O. Box 35, Benoni,
Transvaal, Republic of South Africa
Filed Apr. 26, 1967, Ser. No. 633,823
Claims priority, application Great Britain, May 5, 1966, 19,977/66
Int. Cl. A61h 5/00
U.S. Cl. 128—76.5    9 Claims

ABSTRACT OF THE DISCLOSURE

The invention provides an eye exercising device having, for each of a patient's eyes, a surface on which cards or objects can be placed and an optical system for viewing the surface. The two optical systems are positioned to allow manual manipulation of objects on the surfaces by either hand and afford the patient images of the surfaces constituting a single visual concept.

---

The invention relates to a device for use in eye therapy and in particular to a device for use in exercising the eye.

Known devices used in eye therapy all suffer from certain disadavntages. Thus, the synoptophone is a large instrument suitable for the consulting room but not conveniently portable. The stereoscope does not allow eye exercises to be given in an entertaining or attractive form and consequently children tend to become bored by the exercises recommended. The cheiroscope can only be used for drawing exercises, games employing cards and the like cannot be played.

It is accordingly an object of the invention to provide an improved eye exercising device.

It is a further object to provide an eye exercising device which is conveniently portable.

It is a further object of the invention to provide an eye exercising device which is not limited as to the kind of exercises for which it can be used.

Another object of the invention is to provide an eye exercising device which is comfortable for the user even during protracted exercising.

Yet another object of the invention is to provide an eye exercising device with support surfaces for objects such as cards and the like and an optical system positioned to allow free access to the objects by the users hands.

The invention accordingly provides an eye exercising device comprising a base providing first and second surfaces and mounting first and second optical systems each arranged to permit a user to view a respective one of the surfaces only with the viewed surfaces forming a single visual concept, the optical systems being positioned to allow manual manipulation of objects on the surfaces.

By way of example only, a device embodying the invention is described below with reference to the accompanying drawing, in which:

FIG. 1 is a partially broken away front view of the device;

FIG. 2 is a partially broken away side view of the device; and

FIG. 3 is a ray diagram showing the operation of an optical system incorporated in the device.

The device shown in FIGS. 1 and 2 is designed to be readily portable and has a base 10 providing a generally rectangular upper surface divided into two surfaces 11 and 12 each of which slopes downwardly from the front of the base and inwardly from its sides. The two half surfaces 11 and 12 are used to support cards to be observed or paper on which the user can draw. The surfaces are sloped as described so as to be each normal to the axis of the optical path along which they are viewed. If the half surfaces were coplanar, the images of objects placed on them when viewed through the two optical systems to be described could not be fused into a single visual concept because of the distortion of the images that would result. The surfaces 11 and 12 are separated by a central rib 13 and are limited at the back of the device by ribs 14 and 15 respectively. The ribs 13, 14 and 15 which form a T-shape in plan view serve to retain cards and the like on the surfaces.

A central support member 16 extends upwardly from the base 10 at the centre of the back thereof, that is, at the junction of the ribs 13, 14 and 15. The support member 16 comprises a first portion 17 extending vertically upwardly and a front portion 18 which branches out forwardly at a level above the base 10 and extends upwardly beyond the portion 17. As shown in FIG. 2, the arrangement of the support member 16 allows free access by either of the patient's hands to an article resting on either of the support surfaces 11 and 12; this is necessary when the left eye of a right-handed patient is being treated.

The portion 17 of the support member 16 mounts two mirrors 19 and 20, one on each side thereof, at its upper end. Each mirror slopes downwardly towards the front of the device at an angle of 40° and towards the adjacent side of the device at an angle of 17°.

The upper end of the front portion 18 of the support member 16 mounts an open-bottomed box-like mask having a top 21, left and right front flanges 22 and 23, side flanges 24 and 25 and a back flange 26. The top 21 slopes downwardly to the front of the device and the lower edges of the front flanges 22 and 23 are sufficiently above the upper surface of the base 10 to allow a patient's hand to pass therebetween; this spacing is preferably about 4 inches. The downward slope of the mask, preferably at 30°, provides a comfortable position for the patient's head during exercises which may take up to 20 minutes to perform.

A pair of eyepieces 27 and 28 are mounted in apertures in the rearward part of the top 21 of the mask and to accommodate the nose of the patient the front part of the mask between the eyepieces is cut away to provide an opening 29 which extends downwardly separating the front flanges 22 and 23. A part 30 of the front portion 18 of the support member 16 extends rearwardly between the eyepieces 27 and 28 to separate the fields of view of the two eyepieces.

Mirrors 31 and 32 are mounted under the forward part of the top 21 of the mask, behind the front flanges 22 and 23 respectively. Each of the mirrors 31 and 32 slopes downwardly towards the front of the device at an angle of about 30°, and towards the adjacent side of the instrument at an angle of about 13°.

The eyepieces 27 and 28 cooperate with the mirrors 19, 20 and 31, 32 to provide a pair of optical systems by which the surfaces 11 and 12 or articles thereon can be viewed through the eyepieces 27 and 28 respectively. The eyepieces are conveniently each a spherical lens of +2.25 diopters power.

FIG. 3 is a ray diagram for the optical system comprising the eyepiece 27 and the mirrors 19 and 31. Light from a card or like object 33 on the surface 11 of the base 10 is reflected by the mirror 31 onto the mirror 19 at which it is again reflected through the eyepiece 27. Because of the double reflection, an observer looking through the eyepiece 27 sees a right, virtual image of the card 33. Similarly, the optical system comprising the eyepiece 28 and the mirrors 20 and 32, produces a right virtual image of an object on the surface 12.

To enable the device to be used for example by children with large angle squints, the mirrors 19 and 20 can be made readily replaceable and alternative sets of these mirrors provided.

It will be understood that the device embodying the invention which has been particularly illustrated and described is only one of many ways of carrying the invention into effect in accordance with the spirit and scope thereof as defined in the following claims.

I claim:

1. An eye-exercising device having a base on which said device stands, the base having an upper surface with a pair of flat surface portions on each of which an article to be viewed can rest, a member upstanding from the rear of the base, and a pair of optical systems supported by the member at positions above and spaced from the base so as to permit a user of the device to manually manipulate articles on the upper surface portions, the optical systems providing for each eye of a user of the device a view of a respective one of the two upper surface portions, each optical system having an eyepiece and means for effecting an even number of reflections of light from the associated upper surface portion in the path of the light to the eyepiece, the means for effecting an even number of reflections of light from the associated upper surface portion comprising a pair of mirrors each sloping downwardly to the front and to the adjacent side of the base whereby the patient's line of sight is inclined downwardly toward the rear of the base.

2. A device as claimed in claim 1, in which one of the mirrors of said pair slopes downwardly to the front at about 30° and to the adjacent side of the base at about 13°, and the other mirror of said pair slopes downwardly to the front at about 40° and to the adjacent side of the base at about 17°.

3. A device as claimed in claim 1, in which said flat surface portions on the upper surface of the base slope downwardly toward each other.

4. A device as claimed in claim 1 in which the two upper surface portions are flat and each is normal to the axis of the light therefrom entering the associated optical system.

5. A device as claimed in claim 1 having a ridge upstanding from the base to define the rear edges of the upper surface portions thereof.

6. A device as claimed in claim 1 having a ridge upstanding from the base to separate the upper surface portions thereof.

7. A device as claimed in claim 1 in which the eyepieces are supported by the member so that the optical axis of each eyepiece is inclined to the horizontal.

8. A device as claimed in claim 7 in which the optical axes of the eyepieces are inclined at 45° to the horizontal.

9. A device as claimed in claim 1 in which the eyepieces are mounted in apertures in a mask.

References Cited

UNITED STATES PATENTS 2,223,361  12/1940  Favre _____ 128—76.5

FOREIGN PATENTS 346,235  4/1931  Great Britain.

RICHARD A. GAUDET, Primary Examiner

J. YASKO, Assistant Examiner

U.S. Cl. X.R.

350—133